United States Patent [19]

Reilly et al.

[11] Patent Number: 4,732,399
[45] Date of Patent: Mar. 22, 1988

[54] CUSHION SLIDER TOY

[76] Inventors: Daniel T. Reilly, Rte. 1, Box 369; Joseph Eckenfels, P.O. Box 1036, both of Riverton, Wyo. 82501

[21] Appl. No.: 838,306

[22] Filed: Mar. 10, 1986

[51] Int. Cl.⁴ .............................................. B62B 15/00
[52] U.S. Cl. .................................................. 280/12 B
[58] Field of Search ................. 280/12 A, 12 B, 12 C, 280/12 R, 18, 20; 446/153, 220, 221

[56] References Cited

U.S. PATENT DOCUMENTS

| | | | |
|---|---|---|---|
| 3,080,584 | 3/1963 | Brown | 280/12 B |
| 3,479,046 | 11/1969 | Thompson | 280/18 |
| 3,581,328 | 6/1971 | Smith | 280/12 B |
| 3,628,206 | 12/1971 | Mecham | 280/12 B |
| 3,632,124 | 1/1972 | Cropp | 280/12 |
| 3,871,042 | 3/1975 | Farmer | 280/12 B |
| 4,366,963 | 1/1983 | Reeves et al. | 280/12 B |

FOREIGN PATENT DOCUMENTS

| | | |
|---|---|---|
| 1137143 | 12/1982 | Canada . |
| 1505768 | 5/1969 | Fed. Rep. of Germany . |
| 2409773 | 11/1977 | France . |
| 893661 | 8/1979 | U.S.S.R. . |

Primary Examiner—John J. Love
Assistant Examiner—Richard Camby
Attorney, Agent, or Firm—Dean P. Edmundson

[57] ABSTRACT

A cushion slider toy is described which includes at least one inflatable tube in the form of an annular ring and a covering member which surrounds and encloses the inflatable tube. The top of the covering member forms a flat surface which serves as a seat for a person to sit on while riding the cushion slider toy. Handles may also be attached to the covering member. The cushion slider toy may be used to slide on snow or it may be used on water.

16 Claims, 6 Drawing Figures

CUSHION SLIDER TOY

FIELD OF THE INVENTION

This invention relates to toys. More particularly, this invention relates to toys which are useful for sliding on snow. Even more particularly, this invention relates to inflatable toys which can be used to slide on snow, or to float on water while being towed.

BACKGROUND OF THE INVENTION

Over the past few years it has been common to observe people sliding down snow covered hills on inflated tire tubes instead of sleds. Saucers have also been used for the same purpose.

Such devices, however, do have limitations and disadvantages. For example, saucers are relatively rigid and inflexible and are not very comfortable to ride over bumps, ridges, or other such obstructions because the shock is transmitted directly to the rider. Also, inflated tire tubes have an open central area which can become filled with snow during sliding. Furthermore, depending upon the age and size of the person riding the tube, the person may be too small in comparison to the size of the central area of the tube. As a result, it may be very uncomfortable to ride on the tube when sliding. If such a tube is towed on water, e.g., behind a boat, the results are not satisfactory because of the open central area. Balance of the tube is poor.

Although various different types of devices have been previously proposed, there has not heretofore been provided a cushion slider toy having all of the advantages of the devices provided by the present invention.

SUMMARY OF THE INVENTION

In accordance with the present invention there is provided a unique cushion slider toy which may be used on either snow or water. The toy comprises:

(a) an inflatable tube in the form of an annular ring;
(b) a flexible, durable, water-resistant outer covering member which is adapted to surround and enclose the inflatable tube in a manner such that the covering member provides a flat top surface over the tube and a flat bottom surface below the tube.

The covering member includes an aperture which is adapted to allow the inflatable tube to be inserted into or removed from the interior of the covering member when the tube is deflated. Handle means are secured to the outer covering (e.g, handles are conveniently located on opposite sides).

The top surface of the toy serves as a seat for a person to sit on while riding on the toy. The seat is much more comfortable than riding on a conventional tube having an open central area. The flexibility of the toy also helps to provide a smooth ride, and the resilient nature of the toy protects the rider's body against jarring. The toy is very safe for use by people of all ages. Because the weight on the toy is very evenly distributed on the flat undersurface, the toy provides a faster and more stable ride than is provided by a conventional tire tube.

The cushion slider toy of this invention may utilize conventional inflatable tire tubes. No special tube is required. If a tube should fail for any reason it may be simply taken out of the covering member and replaced with another inflatable tube.

The toy is easy to store since the tube may be deflated anytime to reduce the size of the toy (e.g., so that it may be stored flat or folded). The tube is also very easy to inflate, when necessary. Attachment means (e.g, a loop of strap or rope) may also be easily included on the covering member.

The toy may be used to slide down snow covered hills, or towed on snow covered surfaces, or towed on water. More than one tube may be included, if desired, for making a toboggan.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
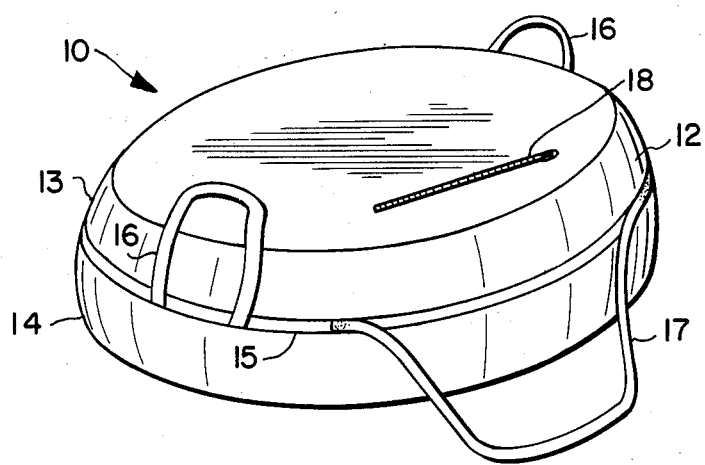
FIG. 1 is a perspective view of one embodiment of cushion slider of the invention.

In FIG. 1 there is shown a perspective view of one embodiment of cushion slider toy 10 of the invention. The toy includes an inflatable tube in the form of an annular ring. A flexible outer covering member 12 surrounds and encloses the tube and is made of a flexible, durable, and water-resistant material such as nylon fabric, canvas, or the like.

In the embodiment shown in FIG. 1 the outer covering member 12 comprises upper section 13 and lower section 14 which are secured together along seam 15, as illustrated. Handle members 16 are preferably attached or secured to opposite sides of the toy. If desired, a strap 17 may also be secured to the covering member 12 for pulling or towing the toy. The handles may be made of any suitable material such as nylon rope or strap, for example.

The flat upper or top surface of the covering member forms a seat for a person to sit on while riding on the toy. The seat is very comfortable. The lower section of the covering member provides a flat surface under the inflated tube.

The covering member also includes an aperture which may be opened or closed by a closure means such as a zipper 18, for example. The deflated tube may be inserted into, or removed from, the interior cavity of the covering member 12 through this aperture. Other types of closures may be used, if desired. For example, a hook and loop fastener system (e.g., "Velcro") may be used, if desired.

The upper section of the covering member may be a durable fabric material such as nylon or canvas or the like. The lower section of the covering member may also be a durable fabric material which may be the same as, or different from, the material of the upper section. Preferably, however, the lower section is made of a very durable material so that it can easily withstand sliding on snow and ice and also resist tearing or excessive wear. Thus, the lower section may be made of a thicker and more durable material than the upper section. The lower section is also preferably flexible.

The fabric used for the covering member may be coated, if desired. For example, it may be coated with vinyl, or rubber, or silicone, or other such water-resistant material, if desired.

The aperture provided in the covering member may be located in the upper section, as illustrated in many of the figures of the drawing, or it may be located in the lower section, or even along an edge, if desired.

The cushion slider toy is adapted for use in sliding on snow or for use on water, if desired. For example, a person may sit on the flat upper surface and ride the toy as it slides down a hill on snow. A person may hold onto the handles in order to maintain balance and stability. If a strap or other attachment means is secured to the covering member, the toy may be towed or pulled while a person is riding on the toy. The toy of this invention may also be used on water (e.g., it may be towed behind a boat).

Because the toy has a flat, continuous bottom surface, snow build-up within the toy is prevented. This also means that the bottom surface distributes weight very uniformly when the toy is used on snow or water.

The upper and lower sections may be joined together in various ways. For example, they may be sewn together, laced together with rope or cord, bonded together with durable adhesive, etc. If the upper and lower sections are made of a thermoplastic material, the adjoining edges thereof may be heat-welded together.

Figure 2:
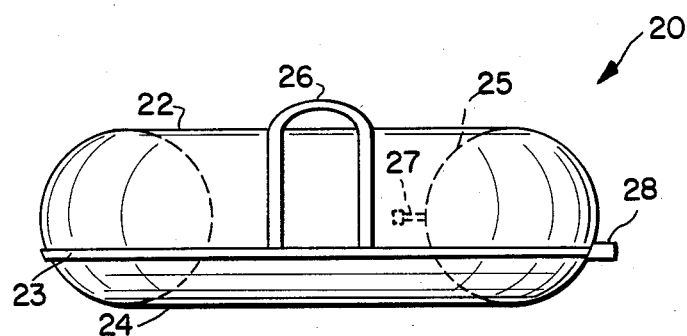
FIG. 2 is an elevational view of another embodiment of cushion slider of the invention.

In FIG. 2 there is shown an elevational view of another embodiment of cushion slider toy 20 of the invention. This figure illustrates a covering member having an upper section 22 and a lower section 24 joined together along seam 23. Shown in dotted lines is inflatable tube 25 which is an annular ring. Handle 26 is secured to the seam 23. The tube 25 may be inflated, or deflated, by means of valve stem 27.

The upper section 22 of the covering member forms a flat surface above the inflatable tube, as shown, which forms a comfortable seat for a person to sit on while riding the toy. The lower section 24 of the covering member forms a flat surface below the inflatable tube, as shown. This flat surface is very beneficial when the toy is used on snow and water. Attachment means 28 is very useful for connecting a tow rope to the toy.

Figure 3:
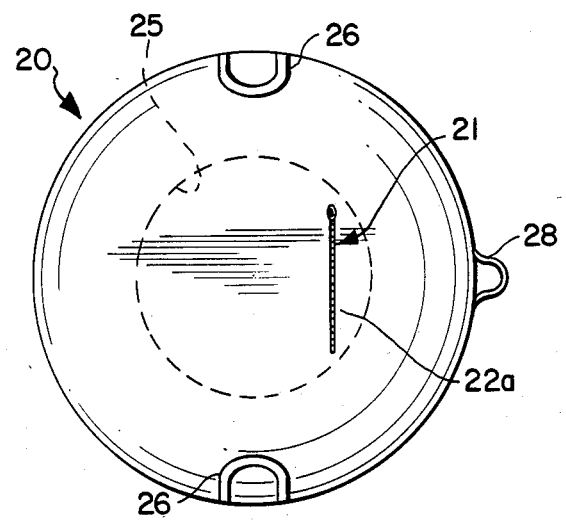
FIG. 3 is a top view of the embodiment of FIG. 2.

In FIG. 3 there is shown a top view of the cushion slider toy shown in FIG. 2. An aperture 22a is present in the upper section 22 of the covering member. A closure such as zipper 21 may be used to close the aperture. The tube 25 may be inserted into the covering, or removed from the covering, through the aperture when the tube is deflated. The tube may be easily and conveniently inflated after it is IO positioned within the covering member.

Figure 4:
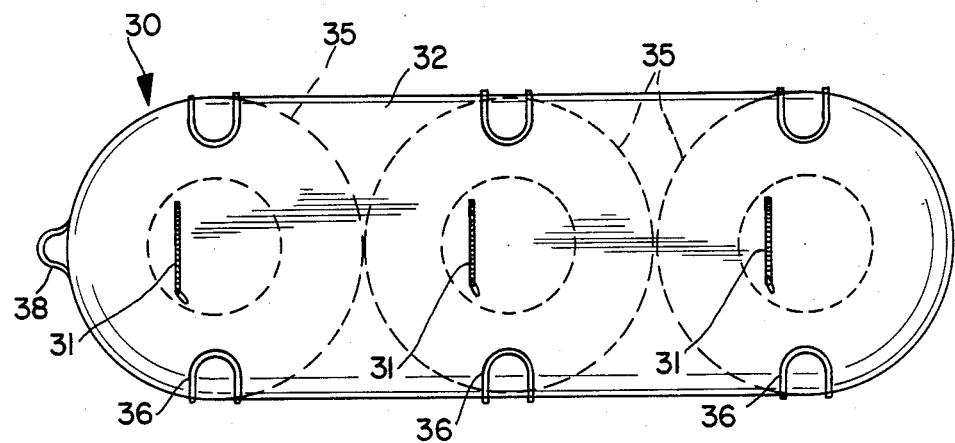
FIG. 4 is a top view of another embodiment of cushion slider of the invention.

In FIG. 4 there is shown a top view of another embodiment of cushion slider toy 30 of the invention. In this embodiment the outer covering member 32 is elongated and a plurality of inflatable tubes 35 are positioned within I5 th cavity of the covering member in edge-to-edge fashion. In this manner an elongated toy is made which is very useful, for example, as a toboggan on which several persons may ride simultaneously. In the embodiment shown in FIG. 4 there are three separate inflatable tubes 35. In the same manner there could be used more, or fewer, inflatable tubes.

A plurality of apertures are present in the top surface of the covering member which are closed by means of zippers 31. Handle members 36 are secured on opposite edges of the covering member, as shown. Attachment means 38 on one end is useful for attachment of a tow rope.

Figure 5:
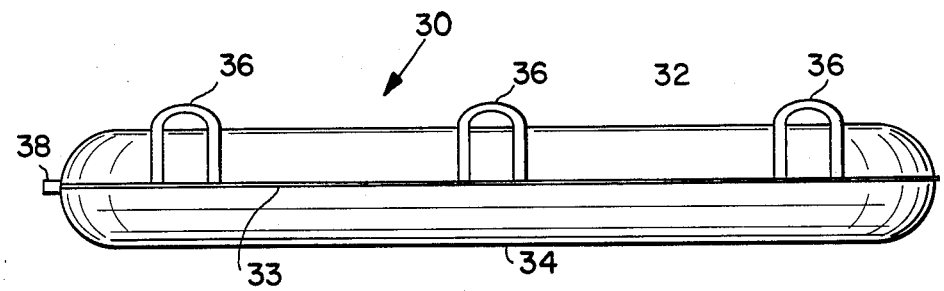
FIG. 5 is an elevational view of the embodiment of FIG. 4.

FIG. 5 is a side elevational view of the embodiment of cushion slider toy 30 shown in FIG. 4. The upper section 32 of the covering member is secured to the lower section 34 along seam 33. This may be done in any of the manners described above. Both the top and lower surfaces of the toy are flat, as illustrated.

The sizes and types of inflatable tubes which are useful in this invention may vary. It has been found that conventional tire tubes are very useful and practical. The outer covering member may be made in any size so as to accommodate the desired size of inflatable tube.

Preferably the inflatable tube effectively fills the cavity within the covering member, i.e., when the tube is inflated the edges of the tube contact the outer covering member and push against it. When the inflatable tube comprises an annular ring the central area will, of course, be vacant but the covering member will be stretched taut over the entire tube.

When more than one inflatable tube is present within a single covering member, preferably the tubes are inflated in a manner such that they are in edge-to-edge contact with each other. This keeps the covering member taut.

The inflatable tubes are preferably made of a durable, flexible material such as rubber which will stretch when inflated. Rubber is also water-resistant and can withstand a wide range of temperatures without loss of functionality. The tubes are preferably ring shaped.

Figure 6:
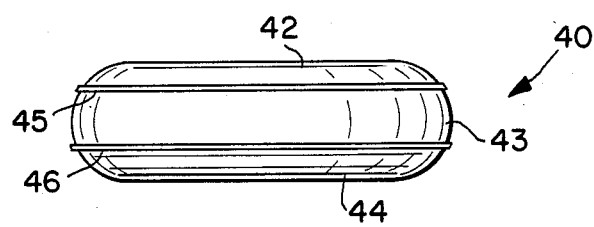
FIG. 6 is a side elevational view of another embodiment of the invention.

Another variation of the toy of this invention is illustrated in FIG. 6. In this embodiment the toy 40 includes a three-piece outer covering member. Thus, there is upper section 42, lower section 44, and an intermediate section 43. Upper section 42 is secured to the intermediate section 43 along seam 45, and lower section 44 is secured to the intermediate section along seam 46. This type of construction minimizes puckering of the covering member over the tube. If desired, more seams may be used and more sections may be included in the construction of the covering member.

The cushion slider toy thus can be made of relatively inexpensive materials. Thus, the toy of this invention is very economical.

Other variants are possible without department from the scope of this invention.

What is claimed is:

1. A cushion slider toy comprising:
   (a) an inflatable tube in the form of an annular ring;
   (b) a flexible, durable, water-resistant, one-piece outer covering member which is adapted to completely surround and enclose said inflatable tube in a manner such that said covering member provides a flat top surface over said tube and a flat bottom surface below said tube; wherein said covering member includes an aperture which is adapted to allow said inflatable tube to be inserted into or removed from the interior of said covering member when said tube is deflated; and wherein said covering member includes closure means adapted to close said apperture; wherein said closure means comprises interlocking fastener portions disposed on opposing sides of said aperture; and
   (c) handle means secured to said outer covering; wherein said flat top surface of said cushion slider toy is adapted to form a seat for a person to sit on while riding said cushion slider toy.

2. A cushion slider toy in accordance with claim 1, wherein said outer covering member comprises upper and lower sections which are secured together.

3. A cushion slider toy in accordance with claim 1, wherein said closure means comprises a zipper.

4. A cushion slider toy in accordance with claim 2, wherein said upper and lower sections of said covering each comprise nylon fabric.

5. A cushion slider toy in accordance with claim 2, wherein said upper and lower sections are secured together in a seam which is between said top surface and said bottom surface and which is in a plane parallel to said top and bottom surfaces.

6. A cushion slider toy in accordance with claim 1, wherein said covering member includes attachment means.

7. A cushion slider toy comprising:
(a) an inflatable rubber tube in the form of an annular ring;
(b) a flexible, durable, water-reeistant, one-piece outer covering member which is adapted to completely surround and enclose said inflatable tube in a manner such that said covering member provides a flat top surface over said tube and a flat bottom surface below said tube; wherein said covering member includes upper and lower seotions which are secured together; wherein said covering member includes an aperture which is adapted to allow said inflatable tube to be inserted into or removed from the interior of said covering member when said tube is deflated; and wherein said covering member includes closure means adapted to close said aperture; wherein said closure means comprises interlocking fastener portions disposed on opposing sides of said aperture; and
(c) handle means secured to opposite sides of said outer covering;
wherein said flat top surface of said cushion slider toy is adapted to form a seat for a person to sit on while riding said cushion slider toy.

8. A cushion slider toy in accordance with claim 7, wherein said upper and lower sections of said outer covering member comprise nylon.

9. A cushion slider toy in accordance with claim 7, wherein said covering member includes attachment means.

10. A cushion slider toy comprising:
(a) at least one inflatable tube, wherein said tube is in the form of an annular ring;
(b) a flexible, durable, water-resistant elongated one-piece outer covering member which is adapted to completely surround and enclose said inflatable tube; wherein said covering member provides a flat top surface over said tube and a flat bottom surface below said tube; wherein said covering member includes at least one aperture which is adapted to allow said inflatable tube to be inserted into or removed from the interior of said covering member when said tube is deflated; wherein said covering member includes closure means adapted to close said aperture; wherein said closure means comprises interlocking fastener portions disposed on opposing sides of said aperture; and
(c) handle means secured to said outer covering; wherein said flat top surface of said cushion slider toy is adapted to form a seat for several persons to sit on while riding said cushion slider toy.

11. A cushion slider toy in accordance with claim 10, wherein said covering member comprises upper and lower sections which are secured together.

12. A cushion slider toy in accordance with claim 10, wherein said covering member comprises nylon fabric.

13. A cushion slider toy in accordance with claim 10, wherein there are a plurality of said inflatable tubes within said covering member, and wherein said covering member includes a plurality of said apertures.

14. A cushion slider toy in accordance with claim 10, wherein there are three of said inflatable tubes, and wherein said covering member includes three apertures in said top surface.

15. A cushion slider toy in accordance with claim 10, wherein said covering member includes closure means adapted to close each said aperture; wherein each said closure means comprises interlocking fastener portions disposed on opposing sides of each said aperature.

16. A cushion slider toy in accordance with claim 15, wherein said closure means comprises a zipper.

* * * * *